United States Patent
Kohara

(10) Patent No.: US 10,496,325 B2
(45) Date of Patent: Dec. 3, 2019

(54) CONTENT DATA RECEIVING DEVICE, CONTENT DATA DELIVERY SYSTEM, AND CONTENT DATA RECEIVING METHOD

(71) Applicant: Yamaha Corporation, Hamamatsu-shi, Shizuoka-Ken (JP)

(72) Inventor: Osamu Kohara, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 15/897,918

(22) Filed: Feb. 15, 2018

(65) Prior Publication Data
US 2018/0173458 A1 Jun. 21, 2018

Related U.S. Application Data

(63) Continuation of application No. PCT/JP2016/073060, filed on Aug. 5, 2016.

(30) Foreign Application Priority Data

Aug. 18, 2015 (JP) .................................. 2015-161091

(51) Int. Cl.
*H04N 21/44* (2011.01)
*G06F 3/06* (2006.01)
(Continued)

(52) U.S. Cl.
CPC .......... *G06F 3/0656* (2013.01); *G06F 3/0613* (2013.01); *G06F 3/0673* (2013.01);
(Continued)

(58) Field of Classification Search
None
See application file for complete search history.

(56) References Cited

U.S. PATENT DOCUMENTS 7,187,677 B2 * 3/2007 Torsner ................ H04L 1/1819
370/394
7,542,986 B2 * 6/2009 Lubbers ................ G06F 3/0601
(Continued)

FOREIGN PATENT DOCUMENTS

JP 4-58646 A 2/1992
JP 2003-333488 A 11/2003
(Continued)

OTHER PUBLICATIONS

International Search Report (PCT/ISA/210) issued in PCT Application No. PCT/JP2016/073060 dated Sep. 6, 2016 with English-language translation (five (5) pages).
(Continued)

*Primary Examiner* — Elias Mamo
(74) *Attorney, Agent, or Firm* — Crowell & Moring LLP

(57) ABSTRACT

A content data receiving device is provided with a communication interface, a buffer, and a processor. The processor, in a case in which the sequence included in the content data that has been received by the communication interface is discontinuous, performs a retransmission request to a transmission side after causing the buffer to hold the content data, causes the buffer to keep holding the content data that has been received by the communication interface until receiving content data in a continuous sequence, and, in a case of receiving the content data in a continuous sequence, outputs the content data to a subsequent stage so that the sequence is continuous.

16 Claims, 12 Drawing Sheets

(51) Int. Cl.
*H04L 13/08* (2006.01)
*H04L 29/08* (2006.01)
*H04N 21/6375* (2011.01)
*G06F 13/10* (2006.01)
*G06F 13/20* (2006.01)
*G06F 13/40* (2006.01)

(52) U.S. Cl.
CPC ............ *G06F 13/102* (2013.01); *G06F 13/20* (2013.01); *G06F 13/4013* (2013.01); *H04L 13/08* (2013.01); *H04L 29/08* (2013.01); *H04N 21/44* (2013.01); *H04N 21/6375* (2013.01)

(56) References Cited

U.S. PATENT DOCUMENTS

| | | | | |
|---|---|---|---|---|
| 7,724,691 | B2* | 5/2010 | Mela | H04L 29/06027 370/261 |
| 7,724,749 | B2* | 5/2010 | Terry | H04L 1/1812 370/329 |
| 7,969,901 | B2* | 6/2011 | Degenhardt | H04L 1/1887 370/252 |
| 8,331,386 | B2* | 12/2012 | Carmon | H04L 1/0061 370/278 |
| 9,876,612 | B1* | 1/2018 | Maveli | H04L 1/08 |
| 2003/0169741 | A1 | 9/2003 | Torsner et al. | |
| 2003/0210669 | A1* | 11/2003 | Vayanos | H04L 1/1845 370/335 |
| 2004/0083301 | A1* | 4/2004 | Murase | H04N 7/17318 709/231 |
| 2009/0193310 | A1 | 7/2009 | Hashimoto | |
| 2009/0257666 | A1 | 10/2009 | Kondou | |
| 2013/0191561 | A1 | 7/2013 | Aoki | |

FOREIGN PATENT DOCUMENTS

| | | |
|---|---|---|
| JP | 2006-195838 A | 7/2006 |
| WO | WO 2008/032660 A1 | 3/2008 |
| WO | WO 2008/041329 A1 | 4/2008 |
| WO | WO 2012/046760 A1 | 4/2012 |

OTHER PUBLICATIONS

Extended European Search Report issued in counterpart European Application No. 16837004.7 dated Feb. 14, 2019 (seven (7) pages).
Japanese-language Office Action issued in counterpart Japanese Application No. 2015-161091 dated May 7, 2019 with English translation (seven (7) pages).
European Office Action issued in counterpart European Application No. 16 837 004.7 dated Sep. 27, 2019 (4 pages).

* cited by examiner

Fig.5

| HEADER | Command | Sequence | Clock | Re_trans_id |
|---|---|---|---|---|
| BODY | AUDIO DATA ||||

| Valid | pkt_id | DATA |
|---|---|---|
| Valid | pkt_id | DATA |
| Valid | pkt_id | DATA |
| Valid | pkt_id | DATA |
| Valid | pkt_id | DATA |
| Valid | pkt_id | DATA |

| | | | |
|---|---|---|---|
| RP ▷ | NG | 003 | DATA |
| | NG | 004 | DATA |
| | OK | 005 | DATA |
| WP ▷ | Valid | pkt_id | DATA |
| | Valid | pkt_id | DATA |
| | Valid | pkt_id | DATA |

Fig.9A

| RP ▷ | NG | 003 | DATA |
|---|---|---|---|
| | NG | 004 | DATA |
| | OK | 005 | DATA |
| | OK | 006 | DATA |
| | OK | 007 | DATA |
| WP ▷ | OK | 008 | DATA |

Fig.9B

| WP ▷ | OK | 009 | DATA |
|---|---|---|---|
| | NG | 004 | DATA |
| | OK | 005 | DATA |
| | OK | 006 | DATA |
| | OK | 007 | DATA |
| RP ▷ | OK | 008 | DATA |

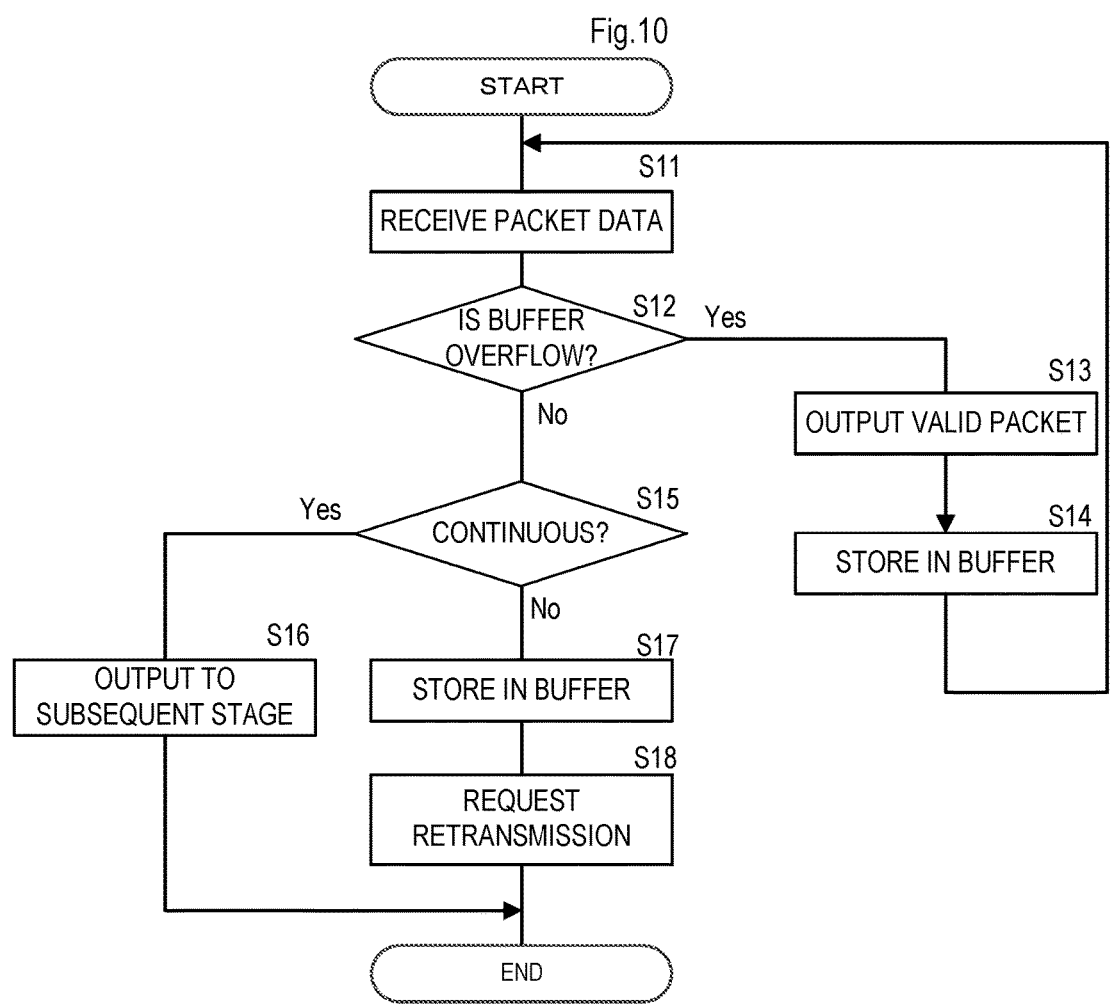

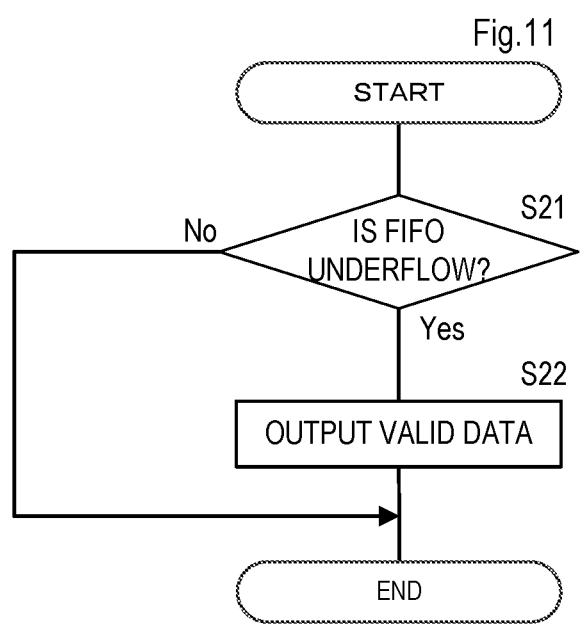

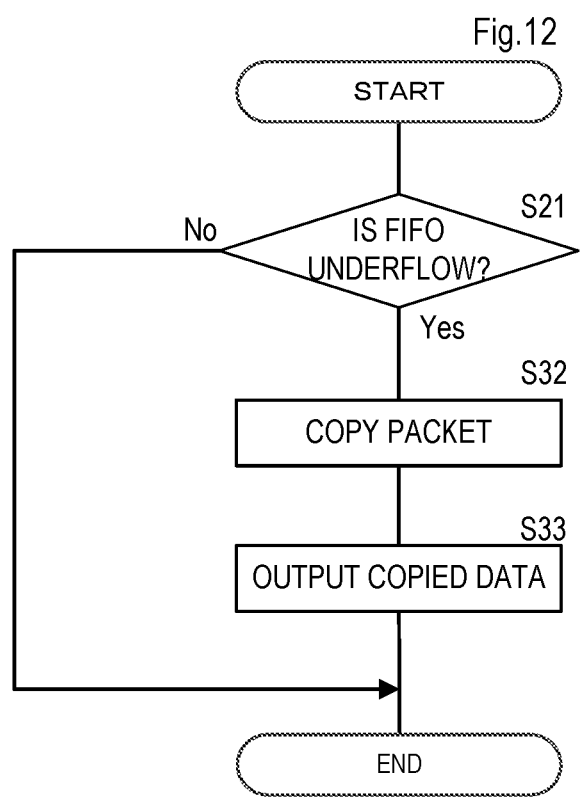

CONTENT DATA RECEIVING DEVICE, CONTENT DATA DELIVERY SYSTEM, AND CONTENT DATA RECEIVING METHOD

CROSS REFERENCE TO RELATED APPLICATIONS

The present application is a continuation application of International Patent Application No. PCT/JP2016/073060, filed on Aug. 5, 2016, which claims priority to Japanese Patent Application No. 2015-161091, filed on Aug. 18, 2015. The contents of these applications are incorporated herein by reference in their entirety.

BACKGROUND OF THE INVENTION

1. Field of the Invention

A preferred embodiment of the present invention relates to a content data receiving device that receives content data, a content data delivery system, and a content data receiving method.

2. Description of the Related Art

Conventionally, a content reproduction system that streams content data from a server to a plurality of clients and reproduces the content data at each client has been known (see Japanese Unexamined Patent Application Publication No. 2006-195838, for example).

A delivery system of Japanese Unexamined Patent Application Publication No. 2006-195838 streams, as content data, compressed audio data such as MP3, from a server to each client. As a result, a user can listen to the audio data stored in a storage of a server, in every room of a house.

However, the content data delivery system of Japanese Unexamined Patent Application Publication No. 2006-195838 does not considered a loss of audio data at a time of delivery. If there is a loss of audio data, continuity of the audio data is lost. If the continuity of the audio data is lost, sound is interrupted or noise sound occurs, which causes an uncomfortable situation for a user.

On the other hand, if a server transmits audio data a plurality of times in advance in consideration of the loss of audio data, a time required for transmission becomes larger and a time until reproduction is started on a client side is delayed, which impairs real-time characteristics.

SUMMARY OF THE INVENTION

In view of the foregoing, an object of a preferred embodiment of the present invention is to provide a content data receiving device, a content data delivery system, and a content data receiving method that are able to ensure real-time characteristics while ensuring the continuity of the content data to be delivered.

A content data receiving device is provided with a communication interface, a buffer, and a processor. The communication interface receives content data including information indicating a sequence. The buffer holds the content data that has been received by the communication interface. The processor, in a case in which the sequence included in the content data that has been received by the communication interface is discontinuous, performs a retransmission request to a transmission side after causing the buffer to hold the content data, causes the buffer to keep holding the content data that has been received by the communication interface until receiving content data in a continuous sequence, and, in a case of receiving the content data in a continuous sequence, outputs the content data to a subsequent stage so that the sequence is continuous.

According to a preferred embodiment of the present invention, real-time characteristics are able to be ensured while the continuity of content data to be delivered is also able to be ensured.

The above and other elements, features, characteristics, and advantages of the present invention will become more apparent from the following detailed description of the preferred embodiments with reference to the attached drawings.

BRIEF DESCRIPTION OF THE DRAWINGS

FIG. 5 illustrates a structure of packet data.

FIG. 9A is a diagram illustrating a structure of a buffer in a state in which an entire area is filled, and FIG. 9B is a diagram illustrating a structure of a buffer at a time of overflow.

FIG. 10 is a flow chart showing an operation of the speaker device.

FIG. 11 is a flow chart showing an operation of the speaker device at a time of detection of underflow.

FIG. 12 is a flow chart showing an operation of the speaker device at the time of detection of underflow.

DETAILED DESCRIPTION OF THE PREFERRED EMBODIMENTS

Figure 1:
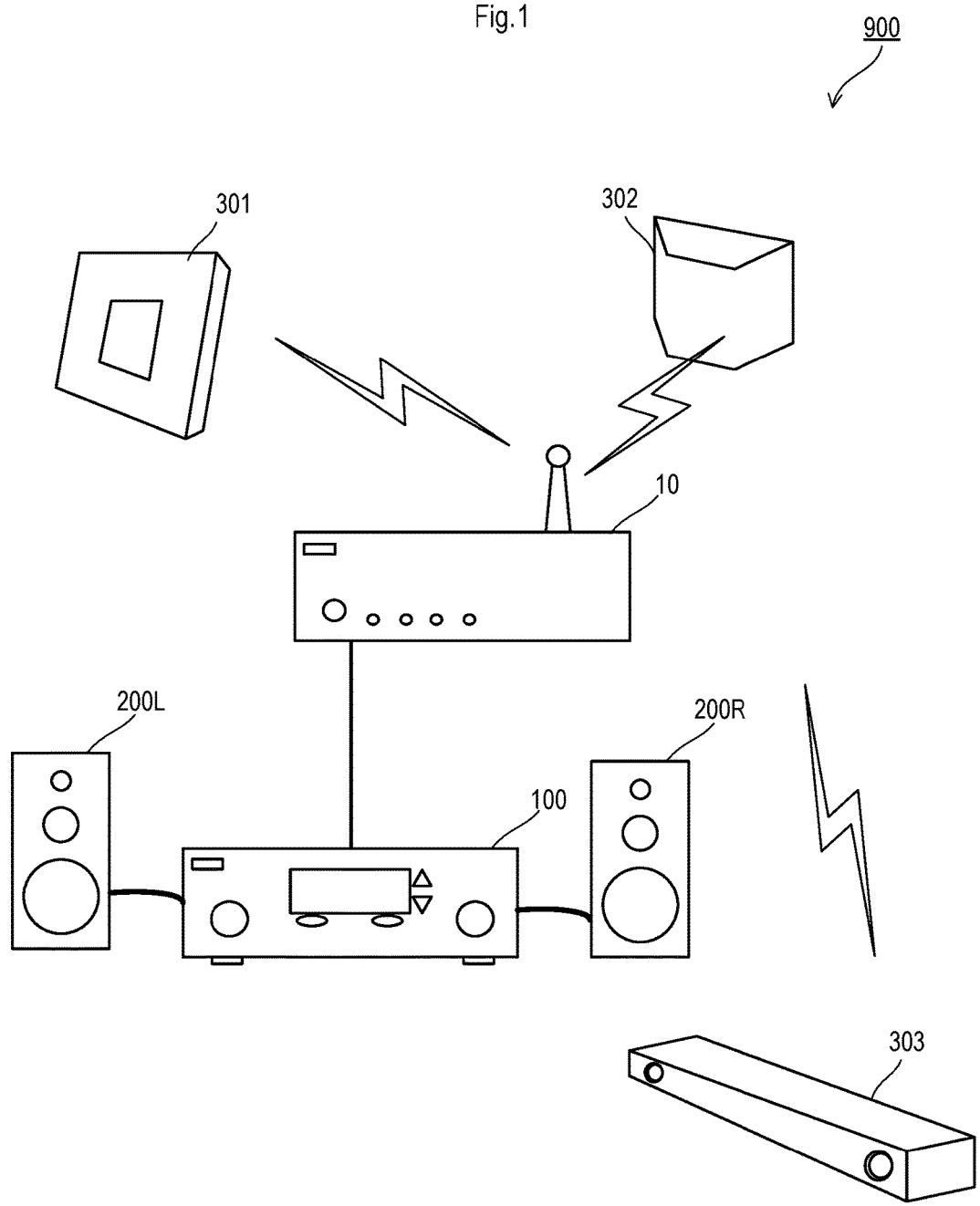
FIG. 1 is a diagram illustrating an overview of a content data delivery system.
Figure 2A:
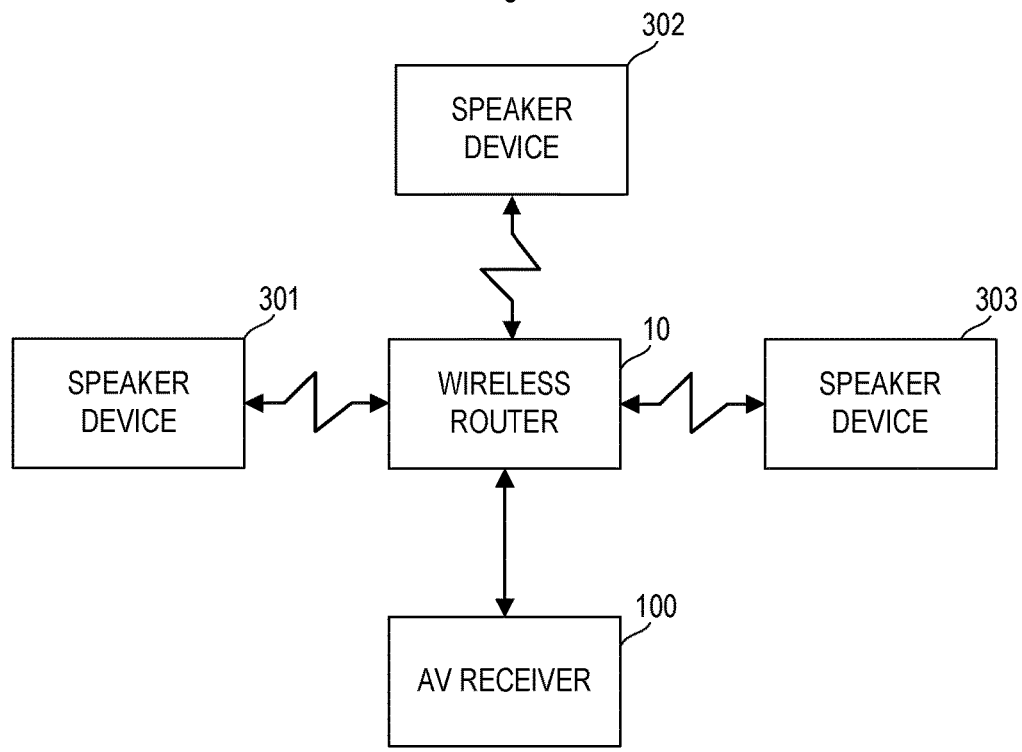
FIG. 2A is a diagram illustrating a connection relationship.
Figure 2B:
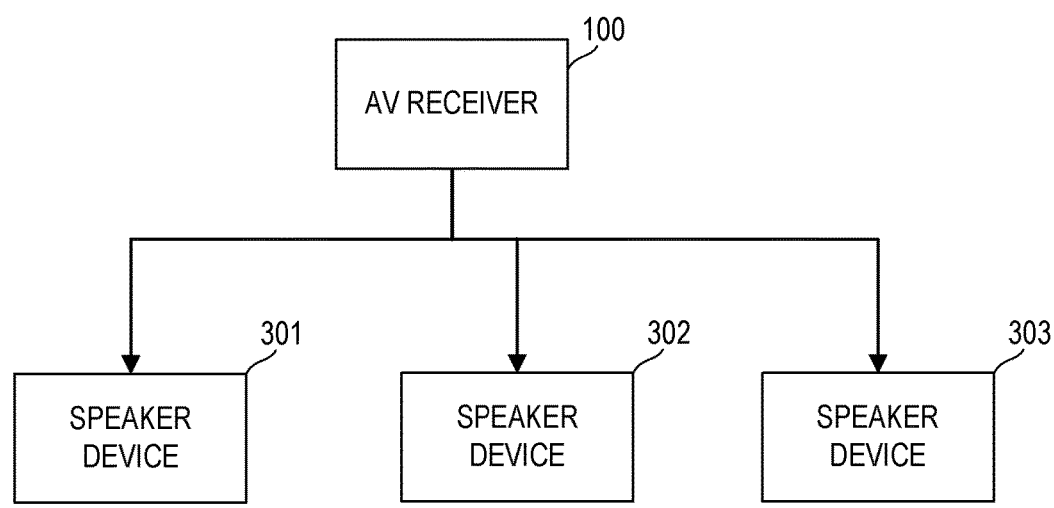
FIG. 2B is a block diagram illustrating a flow of data at a time of delivery of content data.

FIG. 1 is a diagram illustrating an overview of a content data delivery system 900. FIG. 2A is a diagram illustrating the connection relationship of each device. FIG. 2B is a block diagram illustrating a flow of data at a time of delivery of content data.

As illustrated in FIG. 1, the content data delivery system 900 is provided with a wireless router 10, an AV receiver 100, a speaker device 301, a speaker device 302, and a speaker device 303. As illustrated in FIG. 2A, the AV receiver 100, the speaker device 301, the speaker device 302, and the speaker device 303 are network-connected to one another through the wireless router 10. In this example, the wireless router 10 and the AV receiver 100 are connected by a wired LAN (Local Area Network), and the wireless router 10 and each speaker device are connected by a wireless LAN. However, the connection of each device may be wireless or may be wired, and, as long as a mode of the connection enables communication, the mode is not limited to the mode of connection through a network.

As illustrated in FIG. 2B, in the content data delivery system 900 of this example, the AV receiver 100 serves as a server (a content data transmitting device), and delivers content data to the speaker device 301, the speaker device 302, and the speaker device 303 that each serve as a client (a content data receiving device). However, the wireless router 10 may serve as a server that delivers content data, and the AV receiver 100 may be a client. In addition, the wireless router 10 may serve as a server, and the AV receiver 100, the speaker device 301, the speaker device 302, and the speaker device 303 may each serve as a client. In other words, in the content data delivery system, among network-connected devices, a predetermined device (a device specified by a user, for example) serves as the server and other devices each serve as a client.

The content data delivery system 900 streams the content data that is being reproduced in the AV receiver 100 to the speaker device 301, the speaker device 302, and the speaker device 303, and realizes synchronous reproduction in all the devices. Thus, a user listens to audio that is being reproduced by the AV receiver 100 in a living room, for example, and, then, in a case of moving to another room (a bedroom, for example), can also listen to the audio by the speaker device 301 installed in the bedroom.

Figure 3:
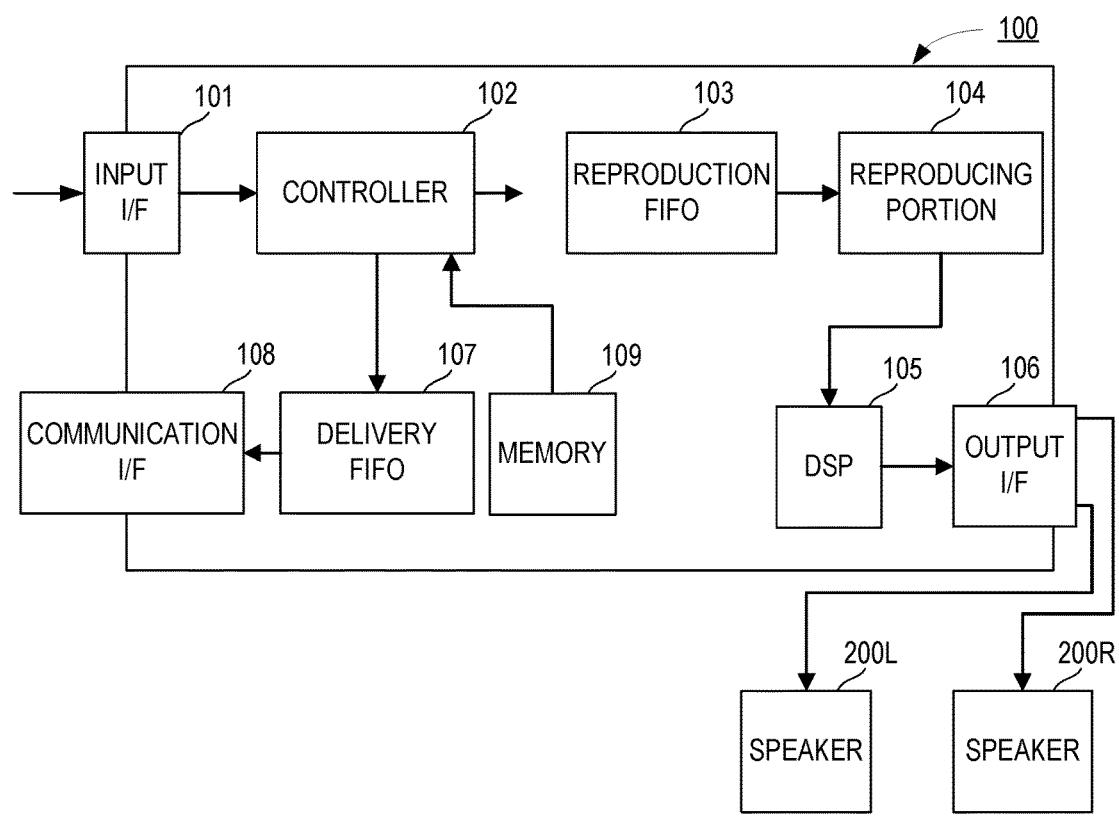
FIG. 3 is a block diagram illustrating a configuration of an AV receiver.

FIG. 3 is a block diagram illustrating a main configuration of the AV receiver 100. It is to be noted that, in this example, while the AV receiver 100 serves as a server, in a case in which other devices other than the AV receiver 100 serve as a server, the other devices are to be provided with the configuration as illustrated in FIG. 3.

The AV receiver 100 is provided with an input I/F (interface) 101, a controller 102, a reproduction FIFO 103, a reproducing portion (reproducer) 104, a DSP 105, an output I/F 106, a delivery FIFO 107, a communication I/F 108, and a memory 109. The controller 102 corresponds to a processor. The controller 102 reads a program (instructions) stored in the memory 109 and executes various tasks.

The input I/F 101 includes an HDMI (registered trademark) terminal, a digital audio input terminal, or an analog audio input terminal, for example, and inputs content data, a digital audio signal, or an analog audio signal from the outside.

The content data is audio data encoded by MP3 and the like, for example. The input I/F 101 outputs input audio data to the controller 102. In addition, the input I/F 101, in a case in which an analog audio signal is input, converts the analog audio signal into a digital audio signal and outputs the digital audio signal to the controller 102.

It is to be noted that the content data may be input from a storage (NAS (Network Attached Storage) or the like, for example) of other devices through the communication I/F 108, may be input from an external server connected through the Internet, or may be input from an built-in storage such as an HDD (Hard Disk Drive).

The controller 102 converts the input audio data into the audio data as it is or audio data in a predetermined encoding method. In addition, the controller 102 outputs the audio data to the reproduction FIFO 103 and the delivery FIFO 107 as packet data. In addition, the controller 102, also in a case in which a digital audio signal is input, converts the digital audio signal into audio data in a predetermined encoding method, and outputs the audio data to the reproduction FIFO 103 and the delivery FIFO 107 as packet data.

FIG. 5 illustrates an example of a packet data structure. The packet data as illustrated in FIG. 5 is composed of a header and a body (audio data). The header includes information (Command) that indicates a type of a packet, information (Sequence) that indicates a number of a packet, information (Clock) that indicates reproduction timing, and various types of information (Re_trans_id) that indicates whether or not the packet is retransmission data.

The Command may indicate that the packet is a packet of audio data and may indicate that the packet is a packet of other data (test data, for example).

The Sequence is used to determine whether or not a client has received packet data in a correct sequence. The client, in a case in which numbers included in the Sequence are discontinuous, determines that there is a loss of a packet and performs a retransmission request to a server.

The Clock is information that indicates reproduction timing (reproduction time) of audio data. The server and the client perform the reproduction of received audio data based on the reproduction time indicated by the Clock. As a result, synchronous reproduction is realized.

The Re_trans_id includes information that indicates whether or not the packet is packet data to the retransmission request.

The controller 102 outputs the packet data as illustrated in FIG. 5 to the reproduction FIFO 103 and the delivery FIFO 107.

The reproduction FIFO 103 is a reproduction temporary storage that holds packet data of a predetermined time and outputs the packet data in an input sequence. The delivery FIFO 107 is a delivery temporary storage that holds packet data of a predetermined time and outputs the packet data in an input sequence. The reproduction FIFO 103 and the delivery FIFO 107 have a capacity that is set in consideration of time (processing delay) required for processing of various processors provided in a subsequent stage. For example, the reproduction FIFO 103, if the processing time of the reproducing portion 104 is 0.1 seconds, the processing time of the DSP 105 is 0.1 seconds, and the time (time in consideration of the retransmission request on a client side to be described below) required for delivering packet data is 1.8 seconds, has a capacity that is set to be equivalent to audio data of about 2 seconds in order to synchronize with the delivery. The delivery FIFO 107 may have a capacity that is set to be equivalent to audio data of about 0.2 seconds obtained by excluding the time required for delivery in order to synchronize with the reproduction.

As a result, it becomes possible to match the reproduction timing of the AV receiver 100 being a server and the reproduction timing of the audio data in each speaker device (a delivery destination of data) being a client. The content data delivery system 900 is able to realize synchronous reproduction in this manner.

The packet data held in the reproduction FIFO 103 is output to the reproducing portion 104. The reproducing portion 104, based on the reproduction time included in the packet data, reproduces the audio data of the packet data and outputs a digital audio signal.

The digital audio signal that has been reproduced by the reproducing portion 104 is subjected to predetermined signal processing (processing of adding a sound field effect by adding a pseudo reflected sound, for example) by the DSP 105 being a server side signal processor, and is output to the output I/F 106.

The digital audio signal that has been output from the output I/F 106 is input to a speaker 200L and a speaker 200R. The speaker 200L and the speaker 200R convert the input digital audio signal into an analog audio signal and amplify the analog audio signal. The speaker 200L and the speaker 200R input an amplified analog audio signal to an own speaker unit. As a result, the speaker 200L and the speaker 200R output sound according to audio data. It is to be noted that the output I/F 106 and each speaker may be connected through a speaker cable (an analog audio line). In such a case, a DAC (Digital-to-Analog Converter) and an amplifying portion are arranged between the DSP 105 and the output I/F 106.

On the other hand, the packet data to be output from the delivery FIFO 107 is delivered to the speaker device 301, the speaker device 302, and the speaker device 303 through the communication I/F 108 being a server side communication portion.

Figure 4A:
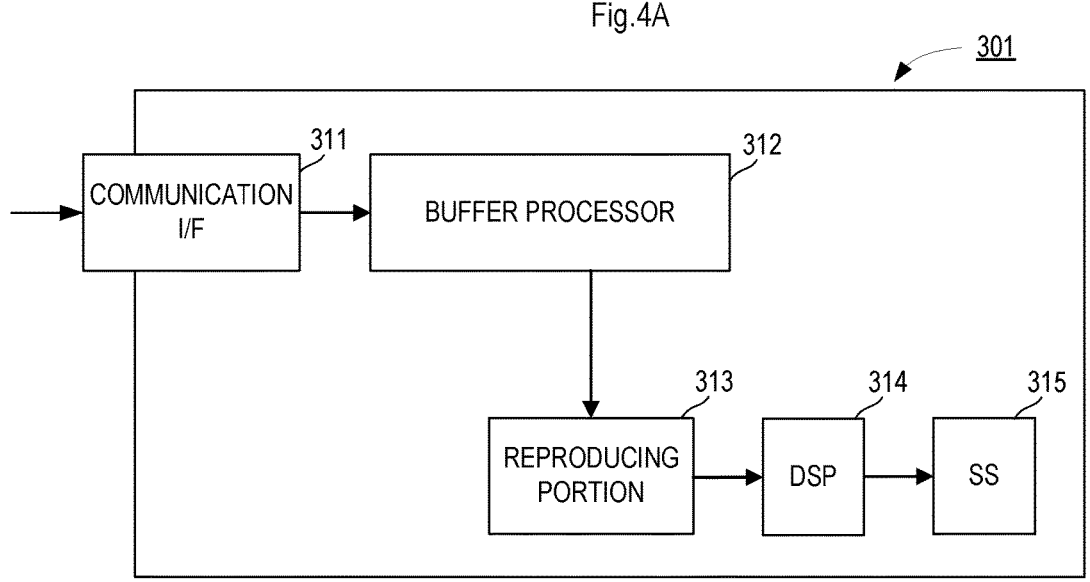
FIG. 4A is a block diagram illustrating a configuration of a speaker device and FIG. 4B is a block diagram illustrating a configuration of a buffer processor.

FIG. 4A is a block diagram illustrating a main configuration of the speaker device 301. Since the main configurations of other speaker device 302 and speaker device 303 are also similar, FIG. 4A and FIG. 4B illustrate the configuration of the speaker device 301 as a representative.

The speaker device 301 is provided with a communication I/F 311, a buffer processor 312, a reproducing portion 313, a DSP 314, and an SS (a sound system) 315.

The communication I/F 311 corresponds to a content data receiving portion, receives packet data delivered from the AV receiver 100 being a server, and inputs the packet data to the buffer processor 312.

Figure 4B:
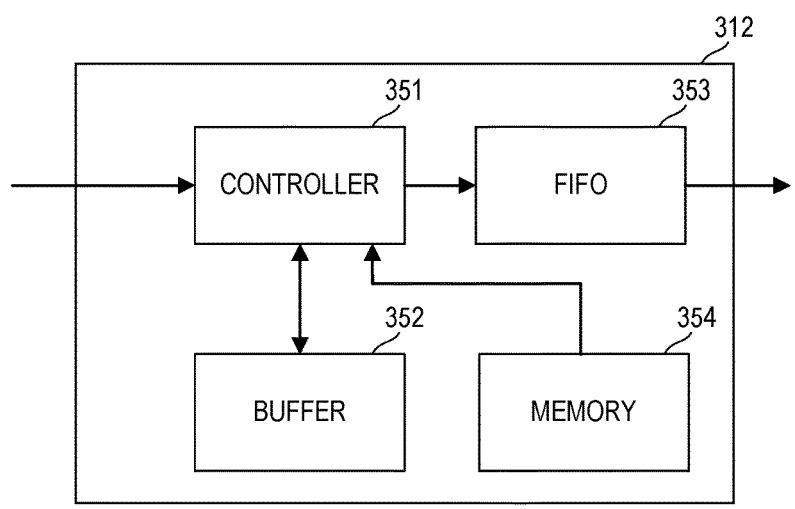

FIG. 4B is a block diagram illustrating a configuration of the buffer processor 312. The buffer processor 312 is provided with a controller 351, a buffer 352, an FIFO 353, and a memory 354. The controller 351 corresponds to a processor. The controller 351 reads a program (instructions) stored in the memory 354 and executes various tasks.

The controller 351 determines whether or not the packet data is received in the correct sequence. As described above, the packet data includes information (Sequence) that indicates a sequence. Therefore, the controller 351, in a case in which the numbers included in the Sequence are continuous, outputs received packet data to the FIFO 353 provided in a subsequent stage (a retransmission request of the controller 351 will be described below).

The FIFO 353 has a capacity that is set corresponding to time (time in consideration of a retransmission request) required for delivery of the packet data, the time having been set in the reproduction FIFO 103. In other words, the FIFO 353 has a capacity that is set to be equivalent to the audio data of 1.8 seconds.

The reproducing portion 313, based on the reproduction time of the packet data output from the FIFO 353, reproduces the audio data of the packet data and outputs a digital audio signal.

The digital audio signal that has been reproduced by the reproducing portion 313 is subjected to predetermined signal processing (processing of adding a sound field effect by adding a pseudo reflected sound, for example) by the DSP 314, and is output to the SS 315. The SS 315 is provided with a DAC, an amplifying portion, and a speaker unit. As a result, the sound according to the audio data delivered from the AV receiver 100 is output from the speaker unit of the speaker device 301, and synchronous reproduction is thus realized.

On the other hand, the controller 351, in a case in which the numbers included in the Sequence are discontinuous, determines that there is a loss of a packet and performs a retransmission request to the AV receiver 100. The controller 351 holds received new packet data in the buffer 352 until the packet data in the correct sequence is retransmitted.

Figures 6A, 6B:
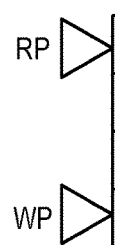
FIG. 6A is a diagram illustrating a structure of a buffer.
FIG. 6B is a diagram illustrating a structure of a buffer when loss packet data is detected.

FIG. 6A is a block diagram illustrating a structure of the buffer 352. In the buffer 352, an area for storing a plurality of pieces of packet data (6 pieces of packet data in this example) by identifying the structure of a transmission packet is set in advance. In the buffer 352, for each piece of the packet data (DATA), information (Valid) that indicates whether or not the packet data is a loss and the packet number (pkt_id) corresponding to the Sequence are indicated. The buffer 352 is brought into an empty state in a case in which the packet data is received in the correct sequence.

In the present preferred embodiment, the controller 351, in a case of receiving the packet data of packet number 005 after having received the packet data of packet number 002, for example, determines that the packet data of packet number 003 and packet number 004 have been lost, and, as indicated in FIG. 6B, stores the packet data of packet number 005 after ensuring a data area of packet numbers 003 and 004 in the buffer 352. In addition, the controller 351, to the AV receiver 100, performs a retransmission request of the packet data of packet number 003 and packet number 004 that have been lost.

It is to be noted that, since the controller 351, in the buffer 352, allocates a storage area of packet number 003 and packet number 004 (Valid=NG) as illustrated in FIG. 6B after identifying (the size of the data portion is 1.4 KB, for example) the structure of a transmission packet; for example, after performing a retransmission request, even when content data of packet number 004 is received in advance to the retransmission request, the controller 351 is able to store the content data of packet number 004 in an area for packet number 004 that is allocated in the buffer 352.

Figure 7A:
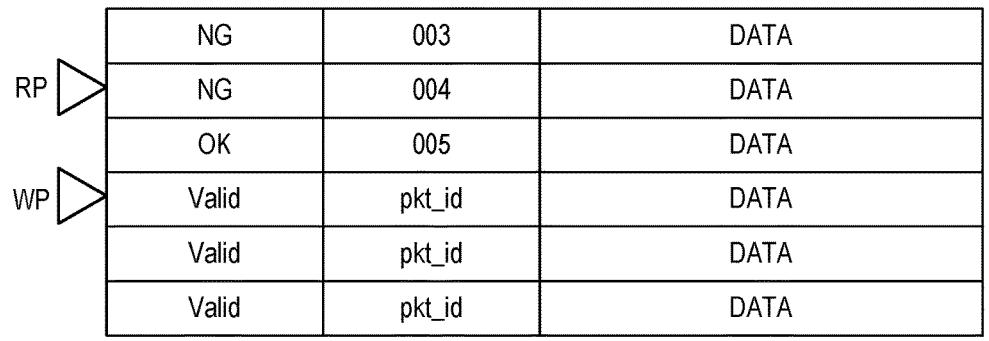
FIG. 7A and FIG. 7B are diagrams illustrating a structure of a buffer when packet data to a retransmission request is received.

On the other hand, the controller 351, in a case of receiving the packet data of packet number 003 to the retransmission request, outputs the packet data of packet number 003 to the FIFO 353 in the subsequent stage and, as indicated in FIG. 7A, advances a RP (Read Pointer) to packet number 004.

Figure 7B:
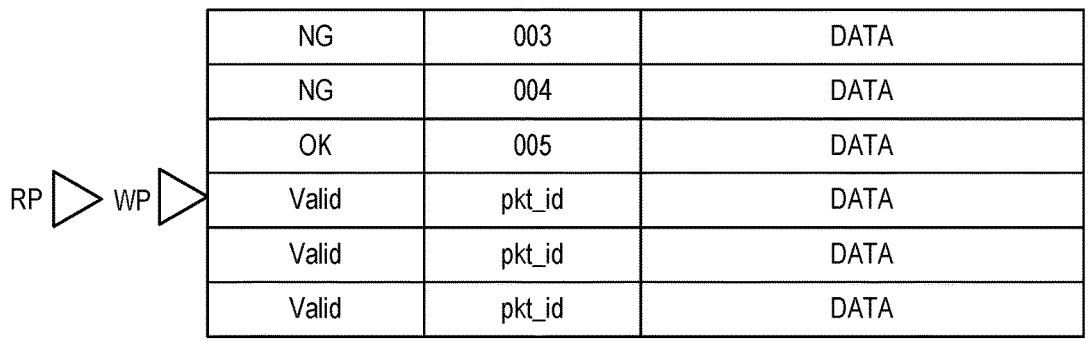

Then, the controller 351, in a case of receiving the content data of packet number 004 to the retransmission request, outputs the packet data of packet number 004 to the FIFO 353 in the subsequent stage, and also further outputs the packet data of packet number 005 that has been held in the buffer 352 provided in the subsequent stage. Then, the controller 351, as illustrated in FIG. 7B, advances the RP (Read Pointer) after packet number 005. As a result, the RP (Read Pointer) and a WP (Write Pointer) are matched and the buffer 352 is brought into an empty state.

Figure 8A:
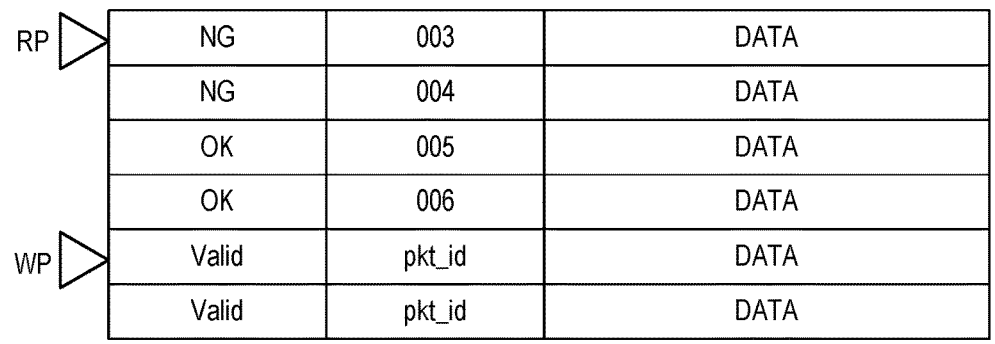
FIG. 8A is a diagram illustrating a structure of a buffer when packet data other than the packet data to the retransmission request is received.
Figure 8B:
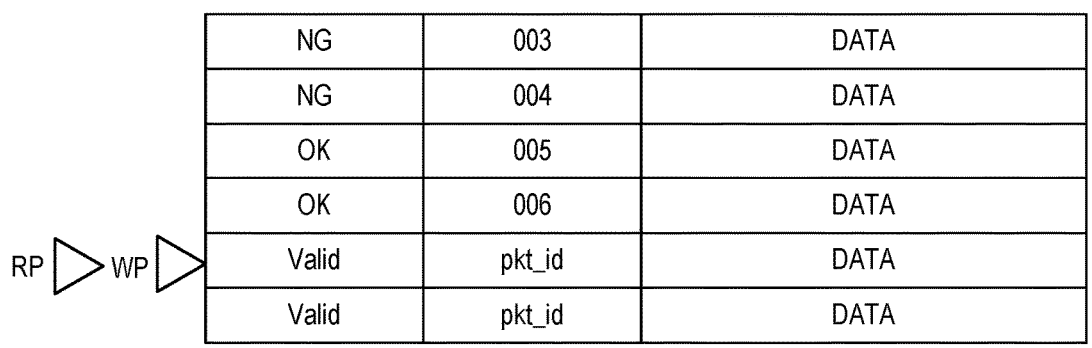
FIG. 8B is a diagram illustrating a structure of a buffer in a case in which underflow is detected in an FIFO provided in a subsequent stage.

As described above, the controller 351 holds the received new packet data in the buffer 352 until the packet data in the correct sequence is retransmitted. Therefore, the controller 351, after performing a retransmission request, in a case in which packet data of packet number 006 is received, for example, stores the packet data of packet number 006 in the buffer 352, as illustrated in FIG. 8A. In the present preferred embodiment, the controller 351, in a case in which the packet data that has been stored in the FIFO 353 in the subsequent stage becomes less than or equal to a reference amount and underflow of the FIFO 353 is detected, outputs valid packet data among the packet data held in the buffer 352, to the subsequent stage. In other words, as illustrated in FIG. 8B, packet number 005 and packet number 006 are output to the FIFO 353 in the subsequent stage. The FIFO 353, since having the capacity that is set to be equivalent to the audio data of 1.8 seconds, is able to handle the loss of the packet data of 1.8 seconds, but, in a case in which a loss exceeding 1.8 seconds occurs, the reproduction of audio data stops. Therefore, the controller 351 outputs next valid packet data to the subsequent stage so as to prevent the reproduction of audio data from stopping.

It is to be noted that, at this time, the controller 351, after writing packet data being a substitute for packet number 003 and packet number 004 that have been lost, into a corresponding data portion of the buffer 352, may output the packet data to the subsequent stage. For example, the packet data of packet number 005 is copied, and the copied packet data is written into a corresponding data portion of the buffer 352 and is output to the subsequent stage as packet data of packet number 003 and packet number 004. As a result, while the packet data is data different from the original data, a loss as audio data is avoided and alternative data is data that has continuity in succession, so that the occurrence of noise sound due to a loss of audio data is able to be prevented.

On the other hand, the controller 351, as illustrated in FIG. 9A, in a case of having received new packet data (that does not correspond to a retransmission request) in a state in which the capacity of the buffer 352 is filled up before a retransmission packet arrives and any more packet data is not able to be held, as illustrated in FIG. 9B, outputs currently valid packet data (packet number 005, packet number 006, packet number 007, and packet number 008 in this example) to the subsequent stage, and overwrites the packet data (packet number 003 in this example) of the oldest number with received packet data.

It is to be noted that, this time again, the packet data of another packet number (packet number 005, for example) may be copied in place of the packet data of packet number 003 and packet number 004 that have been lost and may be output to the subsequent stage as data of these packet number 003 and packet number 004.

As described above, the speaker device 301, in a state in which the continuity of the received packet data is ensured, outputs the received packet data to the subsequent stage as it is, and ensures real-time characteristics. On the other hand, the speaker device 301, only when the received packet data is discontinuous, holds the packet data in the buffer 352, and ensures the continuity by performing a retransmission request. In addition, since the FIFO 353 is provided in the subsequent stage, even when a retransmission request is performed, the real-time characteristics are not impaired.

Subsequently, a description will be made of a series of the above described operations with reference to the flow chart of FIG. 10. While the operations of the speaker device 301 are described in this example, other speaker devices also perform the same operations.

To begin with, the communication I/F 311 of the speaker device 301 receives packet data from the AV receiver 100 (S11). The controller 351 of the buffer processor 312, when receiving the packet data from the communication I/F 311, confirms the capacity of the buffer 352 (S12). The controller 351, in a case of determining that the buffer is in an overflow state, as illustrated in FIG. 9A and FIG. 9B, outputs the currently valid packet data to the subsequent stage (S13), and overwrites the packet data of the oldest number with the received packet data (S14). At this time, in a case in which there is packet data of lost packet number, the packet data of other packet numbers may be copied and may be output to the subsequent stage as data of lost packet number 003. In addition, data having a data portion into which 0 is simply written is created, and may be output to the subsequent stage.

The controller 351, in a case of determining that the capacity of the buffer 352 is not filled up, determines whether or not the continuity of the received packet data with the FIFO 353 in the subsequent stage is ensured (S15). If the continuity is ensured, the packet data is output to the FIFO 353 in the subsequent stage (S16). It is to be noted that the controller 351, in a case in which the received packet data is packet data corresponding to a retransmission request, stops the retransmission request of the packet data.

On the other hand, the controller 351, in a case in which the numbers included in Sequence of the packet data are discontinuous, after ensuring a lost data area in the buffer 352, holds the received packet data in a corresponding portion of the buffer 352 (S17), and performs a retransmission request of the lost packet data (S18).

It is to be noted that the controller 351, regarding a retransmission request that has been performed in the past, in a case of having received no content data corresponding to the retransmission request even after a predetermined time elapses, may perform an operation to perform the retransmission request once again.

FIG. 11 is a flow chart showing an operation at a time of detection of underflow of the FIFO 353. The controller 351, in a case in which the packet data that has been stored in the FIFO 353 becomes less than or equal to a reference amount and underflow is detected (S21), outputs valid packet data among the packet data that has been held in the buffer 352, to the subsequent stage (S22).

The controller 351, as illustrated in FIG. 12, in a case in which the packet data that has been stored in the FIFO 353 becomes less than or equal to a reference amount and the underflow is detected (S21), may copy the valid packet data (S32) among the packet data held in the buffer 352, may create packet data of continuous packet numbers, and may output the packet data to the subsequent stage (S33). As described above, for example, the packet data of packet number 005 is copied, the copied packet data is output to the subsequent stage as packet data of packet number 003 and packet number 004. As a result, since a loss as audio data is avoided, the occurrence of noise sound due to a loss of audio data is able to be prevented.

As described above, the content data receiving device, in a state in which the continuity of content data is ensured, outputs received content data to the subsequent stage as it is, and ensures real-time characteristics. The content data receiving device, only when the received content data is discontinuous, holds the content data in the buffer and ensures the continuity by performing a retransmission request.

It is to be noted that, in a case in which a plurality of pieces of content data are lost, even when a retransmission request is performed, content data having continuity is not necessarily received immediately. Thus, the controller, when performing a retransmission request, assigns a storage area of the content data for which the retransmission request is performed, to the buffer, and, in a case of receiving content data corresponding to the retransmission request, preferably holds received content data in an assigned area.

In addition, the content data receiving device is preferably provided with a temporary storage (FIFO) that temporarily holds the content data that has been output from the controller and outputs the content data that has been held in an input sequence. The content data receiving device, by including the FIFO, is able to ensure real-time characteristics while ensuring continuity, also when performing a retransmission request. In such a case, the controller, in a case in which the content data held in the FIFO becomes less than or equal to a reference amount, outputs valid content data among the content data held in the buffer, to the subsequent stage.

Alternatively, the controller, in the case in which the content data held in the FIFO becomes less than or equal to a reference amount, may copy the valid data among the content data held in the buffer and may output the valid content data to the subsequent stage as content data in a continuous sequence. In such a case, although the data is data different from audio data of a regular sequence, the same data as the audio data to be output later is reproduced instead, so that a possibility that noise sound due to lost audio data occurs is able to be reduced.

It is to be noted that the controller, in a case in which the capacity of the buffer becomes greater than or equal to a reference amount, overwrites data of the oldest sequence with newly received content data.

In addition, the controller, in a case of receiving no content data corresponding to a retransmission request even after a predetermined time elapses, preferably performs the retransmission request once again.

In addition, while, in the present preferred embodiment, an example in which synchronous reproduction is realized in all the devices of the AV receiver 100, the speaker device 301, the speaker device 302, and the speaker device 303 is illustrated, the content data delivery system 900 may perform synchronous reproduction of the AV receiver 100 and a part of the speaker devices, for example, or may perform synchronous reproduction of the AV receiver 100 and some speaker devices specified by a user, for example. In addition, the content data delivery system 900 may be able to be configured by the AV receiver 100 and one speaker device, and may perform synchronous reproduction of the AV receiver 100 and the one speaker device.

The foregoing preferred embodiments are illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. An audio content data receiving device, comprising:
   a communication interface receiving audio content data including information indicating a sequence;
   a buffer holding the audio content data that has been received by the communication interface;
   a processor configured to, in a case in which the sequence included in the audio content data that has been received by the communication interface is discontinuous, perform a retransmission request to a transmission side after causing the buffer to hold the audio content data, cause the buffer to keep holding the audio content data that has been received by the communication interface until receiving audio content data in a continuous sequence, and, in a case of receiving the audio content data in a continuous sequence, output the audio content data to a subsequent stage so that the sequence is continuous; and
   a temporary storage temporarily holding the audio content data that has been output from the processor and outputting the audio content data that has been held in an input sequence;
   wherein the processor, in a case in which the audio content data that has been held in the temporary storage becomes less than or equal to a reference amount, copies valid audio content data among the audio content data that has been held in the buffer, and outputs valid audio content data among the audio content data that has been held in the buffer and the copied data, to the subsequent stage, so that a reproducer reproduces discontinuous data that is different from regular sequence audio data.

2. The audio content data receiving device according to claim 1, wherein the processor, in a case in which the sequence included in the audio content data that has been received by the communication interface is continuous, outputs the audio content data without holding the audio content data in the buffer.

3. The audio content data receiving device according to claim 1, wherein the processor, when performing the retransmission request, assigns a storage area of audio content data for which the retransmission request is performed, to the buffer, and, in a case of receiving audio content data corresponding to the retransmission request, holds received audio content data in an assigned area.

4. The audio content data receiving device according to claim 1, wherein the processor, in a case in which a capacity of the buffer becomes greater than or equal to a reference amount, overwrites data of an oldest sequence with newly received audio content data.

5. The audio content data receiving device according to claim 1, wherein the processor, in a case of receiving no audio content data corresponding to the retransmission request even after a predetermined time elapses, performs the retransmission request again.

6. The audio content data receiving device according to claim 1, wherein the reproducer reproduces the audio content data that the processor has output.

7. An audio content data delivery system, comprising:
   an audio content data receiving device according to claim 1; and
   a transmitting device transmitting the audio content data to the audio content data receiving device.

8. The audio content data delivery system according to claim 7, wherein the transmitting device comprises a second reproducer also reproducing the audio content data to be transmitted to the audio content data receiving device, in an own device.

9. The audio content data delivery system according to claim 8, wherein the transmitting device further comprises a reproduction temporary storage to which a capacity to hold audio content data of a time corresponding to the retransmission request is set, the reproduction temporary storage being provided in a stage preceding the reproducer.

10. The audio content data delivery system according to claim 8, wherein the transmitting device further comprises a delivery temporary storage to which a capacity corresponding to a processing time of the second reproducer is set.

11. An audio content data receiving method, comprising:
    receiving audio content data including information indicating a sequence;
    in a case in which the sequence included in received audio content data is discontinuous, holding the received audio content data in a buffer and performing a retransmission request to a transmission side;
    holding the received audio content data in the buffer until receiving audio content data in a continuous sequence; and
    in a case of receiving the audio content data in a continuous sequence, outputting the audio content data to a subsequent stage so that the sequence is continuous;
    temporarily holding the audio content data that has been output; and in a case in which the audio content data that has been held in a temporary storage that outputs audio content data held in an input sequence becomes less than or equal to a reference amount, replicating valid audio content data among the audio content data that has been held in the buffer and outputting the valid audio content data among the audio content data that has been held in the buffer and the copied data, to the subsequent stage, so that a reproducer reproduces discontinuous data that is different from regular sequence audio data.

12. The audio content data receiving method according to claim 11, further comprising:

outputting the received audio content data without holding the audio content data in the buffer in a case in which the sequence included in the received audio content data is continuous.

13. The audio content data receiving method according to claim 11, further comprising:

assigning a storage area of audio content data for which the retransmission request is performed when performing the retransmission request, to the buffer; and holding received audio content data in an assigned area in a case of receiving audio content data corresponding to the retransmission request.

14. The audio content data receiving method according to claim 11, further comprising:

overwriting data of an oldest sequence with newly received audio content data in a case in which a capacity of the buffer becomes greater than or equal to a reference amount.

15. The audio content data receiving method according to claim 11, further comprising:

performing the retransmission request again in a case of receiving no audio content data corresponding to the retransmission request even after a predetermined time elapses.

16. The audio content data receiving method according to claim 11, further comprising:

reproducing the audio content data that has been output.

* * * * *